Nov. 4, 1924.
G. DAHL
1,514,138
PROJECTING APPARATUS FOR THE PROJECTION OF PANORAMA VIEWS UPON STAGES
Filed Jan. 22, 1923
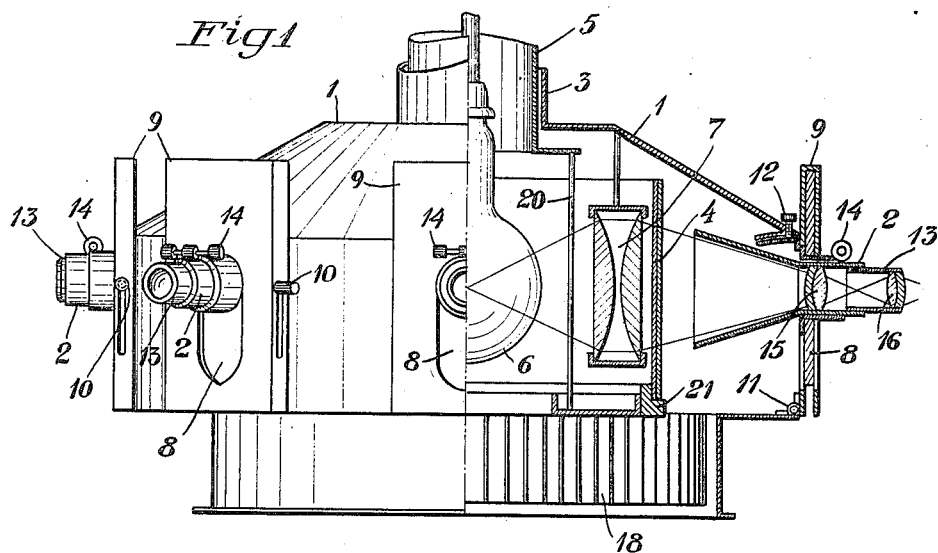
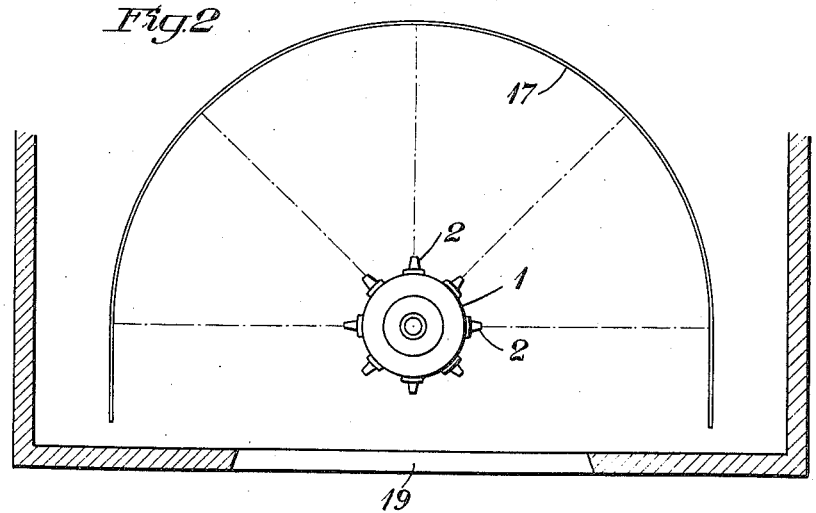
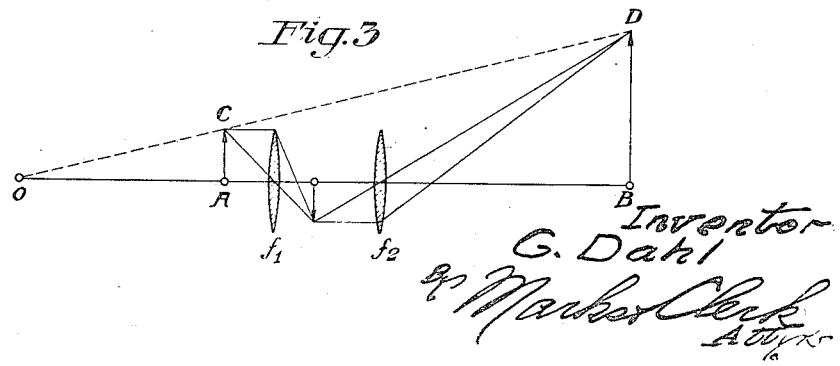
Inventor
G. Dahl Patented Nov. 4, 1924.

1,514,138

UNITED STATES PATENT OFFICE.

GUSTAF DAHL, OF STOCKHOLM, SWEDEN, ASSIGNOR TO AKTIEBOLAGET ARS, OF STOCKHOLM, SWEDEN, A CORPORATION.

PROJECTING APPARATUS FOR THE PROJECTION OF PANORAMA VIEWS UPON STAGES.

Application filed January 22, 1923. Serial No. 614,249.

*To all whom it may concern:*

Be it known that I, GUSTAF DAHL, mechanical engineer, a subject of the King of Sweden, residing at Kungsgatan 65, Stockholm, Sweden, have invented certain new and useful Improvements in Projecting Apparatus for the Projection of Panorama Views Upon Stages, of which the following is a specification.

This invention relates to projecting apparatus for stages and especially to such apparatus which are used for the projection of panorama views upon the back-scene of curved shape or the cyclorama cloth.

For the purpose of producing a coherent panorama for stages and the like there have been used two principally different systems. According to one of these systems a cylindrical and transparent object such as a photographic diapositive is lighted by a centrally arranged lighting source thereby producing a shadow-figure of the diapositive upon the back-scene. This system is possible to use only on very small stages on account of the inferior sharpness and unsufficient brilliancy of the shadow-figure. According to the other system the object is divided in several parts, which parts are projected individually by means of a number of projecting apparatus arranged around a common centre, thereby receiving light from a centrally provided lighting source or from lights built individually in each apparatus. The parts of the pictures thus projected have to be so arranged that their edges coincide, which has been proven to be a difficult task.

The present invention has for its object to overcome the aforesaid difficulties. It consists in a number of speedily rotating projectors arranged in a circle around a common centre, the object being stillstanding, or very slowly moving, cylindrical, and lighted by a centrally arranged source of light. By placing the light in the centre of the object this will become evenly lighted, and by means of the projectors the necessary luminous sharpness is obtained.

One embodiment of the invention is shown in the accompanying drawing.

Fig. 1 is a front view of the apparatus, half of it in section showing the arrangement of a source of light, object and projectors.

Fig. 2 is a horizontal view on a smaller scale of the apparatus and of the backscene.

Fig. 3 is a sketch showing the magnification of the object.

In the casing 1 is a number of projectors 2 arranged. For convenience the casing is made in the form of a rotary body and the projectors are located at the circumference thereof. A tubular shaft 3 is affixed to the casing and connected to some driving power so that the casing with its projectors can be rotated. Within the casing 1 there is provided a rotary body or object 4 preferably of a cylindrical form and carried by a support 20, 21 fixed to a shaft 5 provided inside the shaft 3 so that the object can be rotated if wanted. Said body 4 is transparent and provided with the panorama to be projected consisting for instance of a photographic film. The source of light 6 is provided inside the body 4 and preferably consists of an electric lamp. The projectors are each provided in a known manner with a condenser 7 inside the object 4 and are carried by slides 8 provided in guides 9 so that the projectors can be raised or lowered and also be held in position by setting the screw 10. The guides 9 can furthermore be swung around the hinges 11 so that the projectors will become inclined and held in such position by the screws 12. The objectives 13 can be adjusted by means of the screw 14 as usual. The two systems of lenses 15 and 16 produce upon the back-scene pictures 17, which are not reversed but turned the right way. In the lower portion 18 of the casing 1 a ventilator is preferably provided, by means of which the casing can be cooled.

In the Fig. 2 is shown how the apparatus is arranged on the stage with the proscenium opening 19 and the back-scene 17.

The operation of the apparatus will now be described.

By the arrangement of the source of light 6 in the centre of the rotary body 4 this will, with the pictures applied thereon, become evenly lighted, and by means of the projectors the necessary sharpness will be obtained. The projectors which in their stillstanding position reproduce parts of the object 4 in a number of pictures corresponding to the number of projectors, produce upon the back-scene 17 when rotating a continuous panorama, a cyclorama, because each projector reproduces the whole stillstanding object successively during each revolution. The number of pictures per unit of time then becomes equal to the product of the number of projectors and the number of revolutions per unit of time. As one picture rapidly succeeds the other there will be visible no space between them, although there might be a smaller or larger non-lighted space between each picture. It will therefore not become necessary to have the edges of succeeding pictures to coincide upon the back-scene, which will be more clearly demonstrated below. However, the speed of the rotation is dependent upon the width of the non-lighted space compared with the width of the pictures in such way that it should be increased with the width of the space, in order to avoid fluttering in the picture.

A necessary condition in obtaining the aforesaid reproduction of the panorama is that the projectors give a magnification equal to the proportion between the radius of the curvature of the back-scene 17 and the radius of the object 4. The back-scene should have a cylindrical shape or at least have a circular horizontal section, and the apparatus should be erected in the centre of it.

In order to make the above more clear we will look at the Fig. 3, where the object is represented by the line AC. The lenses 15 and 16 are represented by $f_1$ and $f_2$ and the picture upon the back-scene by BD. O is the source of light. From this Fig. 3 it will in the first place be seen that the object AC is reproduced on the back-scene in correct position, viz turned the right way. If assumed that the Fig. 3 represents a horizontal view through the centres of the lenses, and that the points O, C and D lie on the same straight line, it is obvious that, if AC is a part of the picture affixed to the rotary body 4, the sum of all the parts AC will form the whole picture or circumference of the body 4 with the radius OC, and the sum of all the parts BD must equal the circumference of the back-scene 17 with the radius OD. If the lines OC and OD do not coincide the sum of all the parts BD will not equal the circumference of the back-scene and the result of this will be that the reproduction on the back-scene by each projector is not at rest and no clear conception is obtained of the views. It is therefore essential that the magnification is such that the lines OC and OD coincide. This can be expressed in other words. From the Fig. 3 will be seen that—

$$DB : CA = DO : CO$$

if DB = the size of the reproduction,
CA = the size of the object,
DO = the radius of the curvature of the back-scene.
CO = the radius of the rotary body.

Thus DB:CA = the magnification = the proportion between the radius of the curvature of the back-scene 17 and the radius of the object 4.

Furthermore it is obvious that, when each projector during each revolution of the casing 1 reproduces the object once upon the back-scene, and the picture thus reproduced does not move, then the impression of same upon the retina does not fade away instantly on account of the slowness of the retina, but remains until the next reproduction of the same object by means of the next projector is effected and makes a renewed impression upon the retina. If these impressions occur at every sixteenth of a second or more often, the eye can not distinguish each separate picture but gets the impression of a continuous panorama, evenly lighted. This can be attained by revolving the casing at a rate of at least two revolutions per second when using an apparatus with eight projectors.

If the pictures reproduced by each projector do not fill the back-scene but leave an unlighted space between each picture, such spaces will not be observed, because they rotate with the same speed as the lighted spaces, and the panorama makes the impression to be evenly lighted.

If a wandering panorama is to be effected the object 4 has to be slowly rotated by means of the shaft 5 actuated by a suitable gearing. Also if wanted the object 4 can be raised or lowered.

The apparatus can be built in several stories with a centrally located source of light provided for each story, so that several concentric objects can be arranged, for instance for the purpose of reproducing movable clouds across a landscape, or of effecting changes in colours, a. s. o. This last mentioned effect can also be obtained by providing in a known manner rotatable coloured glass sectors in front of the projectors.

What I claim as new and desire to secure by Letters Patent of the United States of America is:—

1. A projecting apparatus comprising a casing, a rotating shaft fixed to said casing, a number of projectors radially arranged at the circumference of said casing, a source of light at the center of the casing, and a transparent object arranged between the projectors and the source of light, each of said projectors consisting of two objectives having a common main axis and being so spaced that the reversed picture produced by the first objective and falling between the two objectives will be turned the right way by the second objective.

2. A projecting apparatus comprising a casing, a rotating shaft fixed to said casing, a number of projectors radially arranged at the circumference of said casing, a source of light at the center of the casing, and a transparent object arranged between the projectors and the source of light, and a condenser lens system provided for each projector between the light and the object, each of said projectors consisting of two objectives having a common main axis and being so spaced that the reversed picture produced by the first objective and falling between the two objectives will be turned the right way by the second objective.

3. A projecting apparatus comprising a casing, a rotating shaft fixed to said casing, a number of projectors radially arranged at the circumference of said casing, a source of light at the center of the casing, and a transparent object arranged between the projectors and the source of light, said object being held by supports fixed to a shaft, which can be rotated, each of said projectors consisting of two objectives having a common main axis and being so spaced that the reversed picture produced by the first objective and falling between the two objectives will be turned the right way by the second objective.

4. A projecting apparatus comprising a casing, a rotating shaft fixed to said casing, a number of projectors radially arranged at the circumference of said casing, a source of light at the center of the casing, and a transparent object arranged between the projectors and the source of light, said object being held by supports fixed to a shaft, which can be rotated, and a ventilator arranged in the casing, each of said projectors consisting of two objectives having a common main axis and being so spaced that the reversed picture produced by the first objective and falling between the two objectives will be turned the right way by the second objective.

5. A projecting apparatus comprising a casing, a rotating shaft fixed to said casing, a number of projectors radially arranged at the circumference of said casing, a source of light at the center of the casing, and a transparent object arranged between the projectors and the source of light, said projectors being adjustable in the vertical direction and each of said projectors consisting of two objectives having a common main axis and being so spaced that the reversed picture produced by the first objective and falling between the two objectives will be turned the right way by the second objective.

6. A projecting apparatus comprising a casing, a rotating shaft fixed to said casing, a number of projectors radially arranged at the circumference of said casing, a source of light at the center of the casing and a transparent cylindrical object arranged between the projectors and the source of light, a back-scene of about cylindrical shape and provided around the apparatus as a center, the magnification of the object upon the back-scene being equal to the proportion between the radius of curvature of the back-scene and the radius of the cylindrical object, each of said projectors consisting of two objectives having a common main axis and being so spaced that the reversed picture produced by the first objective and falling between the two objectives will be turned the right way by the second objective.

In testimony whereof I affix my signature in presence of two witnesses.

GUSTAF DAHL.

Witnesses:
L. THIEL,
STEN HOWITZ.